(12) United States Patent
Domori et al.

(10) Patent No.: US 10,501,360 B2
(45) Date of Patent: Dec. 10, 2019

(54) GLASS RIBBON MANUFACTURING APPARATUS AND METHOD FOR MANUFACTURING GLASS RIBBON

(71) Applicant: Nippon Electric Glass Co., Ltd., Shiga (JP)

(72) Inventors: Koji Domori, Shiga (JP); Daiki Haraguchi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 134 days.

(21) Appl. No.: 15/529,261

(22) PCT Filed: Dec. 15, 2015

(86) PCT No.: PCT/JP2015/085088
§ 371 (c)(1),
(2) Date: May 24, 2017

(87) PCT Pub. No.: WO2016/104256
PCT Pub. Date: Jun. 30, 2016

(65) Prior Publication Data
US 2017/0260078 A1    Sep. 14, 2017

(30) Foreign Application Priority Data

Dec. 22, 2014   (JP) .................... 2014-258895

(51) Int. Cl.
*C03B 25/12* (2006.01)
*C03B 17/06* (2006.01)
*C03B 35/16* (2006.01)
(52) U.S. Cl.
CPC ............ *C03B 25/12* (2013.01); *C03B 17/064* (2013.01); *C03B 35/16* (2013.01)

(58) Field of Classification Search
CPC ... C03B 17/061; C03B 17/062; C03B 17/064; C03B 25/12; C03B 35/16; C03B 35/161; C03B 35/189
See application file for complete search history.

(56) References Cited

U.S. PATENT DOCUMENTS 1,514,385 A * 11/1924 Hitchcock ............... C03B 25/12
65/118
2011/0197634 A1 * 8/2011 Eta .......................... C03B 17/06
65/97

(Continued)

FOREIGN PATENT DOCUMENTS

CN        103003208        3/2013
CN        103068753        4/2013
(Continued)

OTHER PUBLICATIONS

International Preliminary Report on Patentability and Written Opinion of the International Searching Authority dated Jun. 27, 2017 in International (PCT) Application No. PCT/JP2015/085088.

(Continued)

*Primary Examiner* — Lisa L Herring
(74) *Attorney, Agent, or Firm* — Wenderoth, Lind & Ponack, L.L.P.

(57) ABSTRACT

Provided is a glass ribbon manufacturing apparatus in which at least one of support rollers configured to support both sides of a glass ribbon (G) in a width direction in an annealing region and a cooling region is a shape stabilization roller configured to stabilize a shape of the glass ribbon (G) curved in the width direction. The shape stabilization roller includes a first roller (11) arranged on one surface side of the glass ribbon (G) and a second roller (12) arranged on another surface side of the glass ribbon (G). Inner end portions (11*c*) of rollers (11*a*) of the first roller (11) are all positioned on an (Continued)

outer side, in the width direction, of outer end portions (12*c*) of rollers (12*a*) of the corresponding second roller (12) in the width direction.

11 Claims, 4 Drawing Sheets

(56) References Cited

U.S. PATENT DOCUMENTS

| | | | |
|---|---|---|---|
| 2012/0090357 A1* | 4/2012 | Nakamura | C03B 25/12 65/95 |
| 2013/0152634 A1 | 6/2013 | Oda et al. | |
| 2015/0284281 A1 | 10/2015 | Oda et al. | |

FOREIGN PATENT DOCUMENTS

| | | |
|---|---|---|
| JP | 2012-509844 | 4/2012 |
| WO | 2012/004625 | 1/2012 |

OTHER PUBLICATIONS

Chinese Office Action dated Jan. 23, 2019 in corresponding Chinese Patent Application No. 201580044584.5 with English translation of the Search Report.

\* cited by examiner

FIG. 6

# GLASS RIBBON MANUFACTURING APPARATUS AND METHOD FOR MANUFACTURING GLASS RIBBON

TECHNICAL FIELD

The present invention relates to a glass ribbon manufacturing apparatus and a method of manufacturing a glass ribbon.

BACKGROUND ART

As one of typical methods of manufacturing a glass ribbon, there is widely known an overflow downd-raw process for causing molten glass to flow down from a compact to form a glass ribbon.

A glass ribbon manufacturing apparatus using the overflow downd-raw process generally has a forming region in which the molten glass is caused to flow down from the compact to form a glass ribbon having a predetermined width dimension, an annealing region in which the formed glass ribbon is annealed to remove an internal strain thereof, and a cooling region in which the annealed glass ribbon is cooled to the vicinity of a room temperature. Further, it is general to provide a plurality of rollers configured to support both sides of the glass ribbon in a width direction along the glass ribbon.

The glass ribbon immediately after the formation in the forming region is in a state in which the glass ribbon is not completely hardened yet. A shape thereof is fixed along with the annealing in the annealing region. At this time, the glass ribbon sometimes exhibits a tendency to be curved in the width direction in an annealing process. It is difficult to stabilize the above-mentioned curved shape of the glass ribbon, in particular, a direction of curvature with convexity to a front side or a rear side by existing equipment. Due to the difficulty, there is a fear in that quality of the manufactured glass ribbon, and eventually, quality of a glass sheet may be varied.

To cope with the above-mentioned problem, for example, in the invention disclosed in Patent Literature 1, the shape of the glass ribbon is stabilized by arranging rollers configured to nip the both sides of the currently moved down glass ribbon in the width direction in a state in which axes thereof are inclined within a horizontal plane so as to extend along a curved shape of the glass ribbon.

CITATION LIST

Patent Literature 1: JP 2012-509844 A

SUMMARY OF INVENTION

Technical Problem

However, a supporting structure disclosed in Patent Literature 1 is based on a precondition that the glass ribbon is always curved in a fixed direction, that is, a precondition that the glass ribbon becomes convex to any one of the surface side and the rear side. Therefore, for example, when the glass ribbon starts being curved in a direction opposite to a supposed direction, a direction of inclination of the axes of the rollers and the direction of curvature of the glass ribbon, that is, a direction of inclination of end portions in the width direction become opposite to each other. Then, when the glass ribbon is nipped between the rollers, a large load is applied to the glass ribbon from the rollers. Due to the load applied to the glass ribbon from the rollers, there is a risk of generation of a crack in the glass ribbon.

In view of the circumstances described above, the present invention has a technical object to stabilize a direction of curvature of a glass ribbon without generating a crack therein.

Solution to Problem

In order to solve the above-mentioned problem, according to one embodiment of the present invention, there is provided a glass ribbon manufacturing apparatus, comprising: an annealing region for annealing a formed glass ribbon to remove an internal strain thereof; a cooling region for cooling the glass ribbon being annealed to a vicinity of a room temperature; and a plurality of support rollers configured to support both sides of the glass ribbon in a width direction and arranged along a direction of downward movement of the glass ribbon in the annealing region and the cooling region, wherein at least one of the plurality of support rollers being arranged comprises a shape stabilization roller configured to stabilize a shape of the glass ribbon curved in the width direction, wherein the shape stabilization roller comprises: a first roller being arranged on one surface side of the glass ribbon and having a pair of support portions configured to support the both sides of the glass ribbon in the width direction; and a second roller being arranged on another surface side of the glass ribbon and having a pair of support portions configured to support the both sides of the glass ribbon in the width direction, and wherein an inner end portion of each of the pair of the support portions of the first roller in the width direction is positioned on an outer side, in the width direction, of an outer end portion of a corresponding one of the pair of the support portions of the second roller in the width direction. Here, the width direction of the glass ribbon is defined based on the width direction of the glass ribbon in a flat state as a reference (the same applies to the following).

In the above-mentioned configuration, the inner end portions of the support portions of the first roller in the width direction are all positioned on the outer side, in the width direction, of the outer end portions of the support portions of the corresponding second roller in the width direction. Specifically, a mode, in which the glass ribbon is supported by the second roller on the inner side of the first roller in the width direction, can be employed. In this manner, the glass ribbon can be supported in a curved shape that is convex toward the first roller in an inward width direction. Therefore, the shape of the glass ribbon curved in the width direction can be stabilized by the shape stabilization roller.

In the configuration described above, the support portions of the first roller and the support portions of the second roller are not arranged so as to be opposed to each other through the glass ribbon therebetween. Specifically, the support portions of the first roller and the support portions of the second roller do not employ a mode in which predetermined width-direction regions on both sides of the glass ribbon in the width direction are nipped therebetween. Therefore, when the glass ribbon starts being curved in a direction opposite to a supposed direction, a load, which is applied to the glass ribbon from the shape stabilization roller when the glass ribbon is supported by the shape stabilization roller, is reduced as compared with a load applied when the rollers nipping the both sides of the glass ribbon in the width direction are arranged in a state in which axes thereof are inclined within a horizontal plane. Specifically, the load applied to the glass ribbon can be reduced as compared with the load applied when the rollers nipping the both sides of the glass ribbon in the width direction are arranged in the state in which the axes thereof are inclined within the horizontal plane. Thus, the risk of generation of a crack in the glass ribbon can be reduced. As described above, in the glass ribbon manufacturing apparatus of the present invention, even when the glass ribbon starts being curved in the direction opposite to the supposed direction, the direction of curvature can be stabilized on one of a front side and a rear side without generating a crack in the glass ribbon.

In the above-mentioned configuration, it is preferred that the support roller positioned uppermost in the cooling region comprise the shape stabilization roller.

With the configuration described above, the shape of the glass ribbon curved in the width direction can be effectively stabilized. This is because a supporting force can be more reliably obtained from the first roller and the second roller due to sufficient solidification of the glass ribbon in the cooling region.

In the above-mentioned configuration, it is preferred that the shape stabilization roller further be arranged in the annealing region.

With the configuration described above, the shape of the glass ribbon curved in the width direction can be effectively stabilized in the annealing region.

In the above-mentioned configuration, it is preferred that the first roller of the shape stabilization roller provided in the annealing region be arranged on a surface side of the glass ribbon, which is opposite to a surface side on which the first roller of the shape stabilization roller provided in the cooling region is arranged.

With the configuration described above, the direction of curvature of the glass ribbon, which is temporarily oriented in the annealing region, can be directed in an opposite direction in the cooling region. In this manner, a tendency such as warp, deflection, or strain of the glass ribbon can be suppressed.

Further, with the configuration described above, the glass ribbon is curved in a vertical direction with a portion at which the direction of curvature is inverted as a center. Therefore, a periphery of the inverted portion functions as a resistance for inhibiting bending deformation of the glass ribbon in the width direction. Therefore, the deformation of the glass ribbon in the width direction is less likely to be caused. Meanwhile, the curvature of the glass ribbon in the width direction functions as a resistance for inhibiting bending deformation of the glass ribbon in the vertical direction. Therefore, the deformation of the glass ribbon in the vertical direction is less likely to be caused. With a synergetic effect thereof, the deformation of the glass ribbon in the width direction and the vertical direction is suppressed. In this manner, a disadvantage that a posture of the glass ribbon is disturbed by a rising air current can be reduced in the annealing region. As a result, the glass ribbon can be annealed with a desired temperature distribution in the annealing region. Thus, the internal strain of the glass ribbon can be reliably removed.

In the above-mentioned configuration, it is preferred that the glass ribbon manufacturing apparatus further comprise an auxiliary roller arranged below the shape stabilization roller in the annealing region and being configured to auxiliarly stabilize a shape of the glass ribbon curved in the width direction, wherein the auxiliary roller comprises the first roller and the second roller, and wherein a distance between the first roller and the second roller of the auxiliary roller in a thickness direction of the glass ribbon is larger than a distance between the first roller and the second roller of the shape stabilization roller provided in the annealing region in the thickness direction. Here, the thickness direction of the glass ribbon is defined based on a thickness direction of the glass ribbon in the flat state as a reference (the same applies to the following).

With the configuration described above, the auxiliary roller supports the glass ribbon in a contact manner only when a curved shape or a position of the glass ribbon is about to greatly change so that a change in curved state or position of the glass ribbon can be suppressed. Therefore, the contact of the auxiliary roller with the glass ribbon can be suppressed. Therefore, application of a load to the glass ribbon due to the contact can be suppressed.

In the above-mentioned configuration, it is preferred that the first roller of the shape stabilization roller provided in the annealing region be arranged on a surface side of the glass ribbon, which is opposite to a surface side on which the first roller of the shape stabilization roller provided in the cooling region is arranged, and the first roller of the auxiliary roller is arranged on the same surface side of the glass ribbon as a surface side on which the first roller of the shape stabilization roller provided in the cooling region is arranged.

With the configuration described above, the direction of curvature of the glass ribbon in the width direction can be inverted in the cooling region and in the annealing region. Then, the curved shape of the glass ribbon can be fitted to the curved shape in the cooling region to some degree by the auxiliary roller before the glass ribbon is moved down into the cooling region. As a result, the direction of curvature of the glass ribbon can be gently inverted. Through inversion of the direction of curvature of the glass ribbon, the load applied to the glass ribbon can be reduced.

In the above-mentioned configuration, it is preferred that the support roller, which is configured to nip the both sides of the glass ribbon in the width direction, be provided between the shape stabilization roller and the auxiliary roller in the annealing region.

With the configuration described above, oscillation of the both ends of the glass ribbon in the width direction can be suppressed by the rollers nipping the both sides of the glass ribbon in the width direction in the annealing region, thereby effectively stabilizing the curved shape of the glass ribbon.

In the above-mentioned configuration, it is preferred that the support roller, which is configured to nip the both sides of the glass ribbon in the width direction, be provided below the shape stabilization roller in the cooling region.

With the configuration described above, oscillation of the both ends of the glass ribbon in the width direction can be suppressed by the rollers nipping the both sides of the glass ribbon in the width direction in the cooling region, thereby effectively stabilizing the curved shape of the glass ribbon.

In order to solve the above-mentioned problem, according to one embodiment of the present invention, there is provided a method of manufacturing a glass ribbon, comprising: an annealing step of annealing a formed glass ribbon to remove an internal strain thereof; and a cooling step of cooling the glass ribbon being annealed to a vicinity of a room temperature, a plurality of support rollers being configured to support both sides of the glass ribbon in a width direction and being provided along a direction of downward movement of the glass ribbon in the annealing step and the cooling step, wherein at least one of the plurality of the support rollers being arranged comprises a shape stabilization roller configured to stabilize a shape of the glass ribbon curved in the width direction, wherein the shape stabilization roller comprises: a first roller being arranged on one surface side of the glass ribbon and having a pair of supporting portions configured to support the both sides of the glass ribbon in the width direction; and a second roller being arranged on another surface side of the glass ribbon, having a pair of supporting portions configured to support the both sides of the glass ribbon in the width direction, and wherein an inner end portion of each of the pair of the support portions of the first roller in the width direction is arranged on an outer side, in the width direction, of an outer end portion of a corresponding one of the pair of the support portions of the second roller in the width direction.

With the configuration described above, substantially similar functions and effects to those of the glass ribbon manufacturing apparatus, which is first described above, can be obtained.

Advantageous Effects of Invention

As described above, according to the present invention, the direction of curvature of the glass ribbon can be stabilized without generating the crack in the glass ribbon.

DESCRIPTION OF EMBODIMENTS

Now, a mode for carrying out the present invention is described with reference to the drawings.

Figure 1:
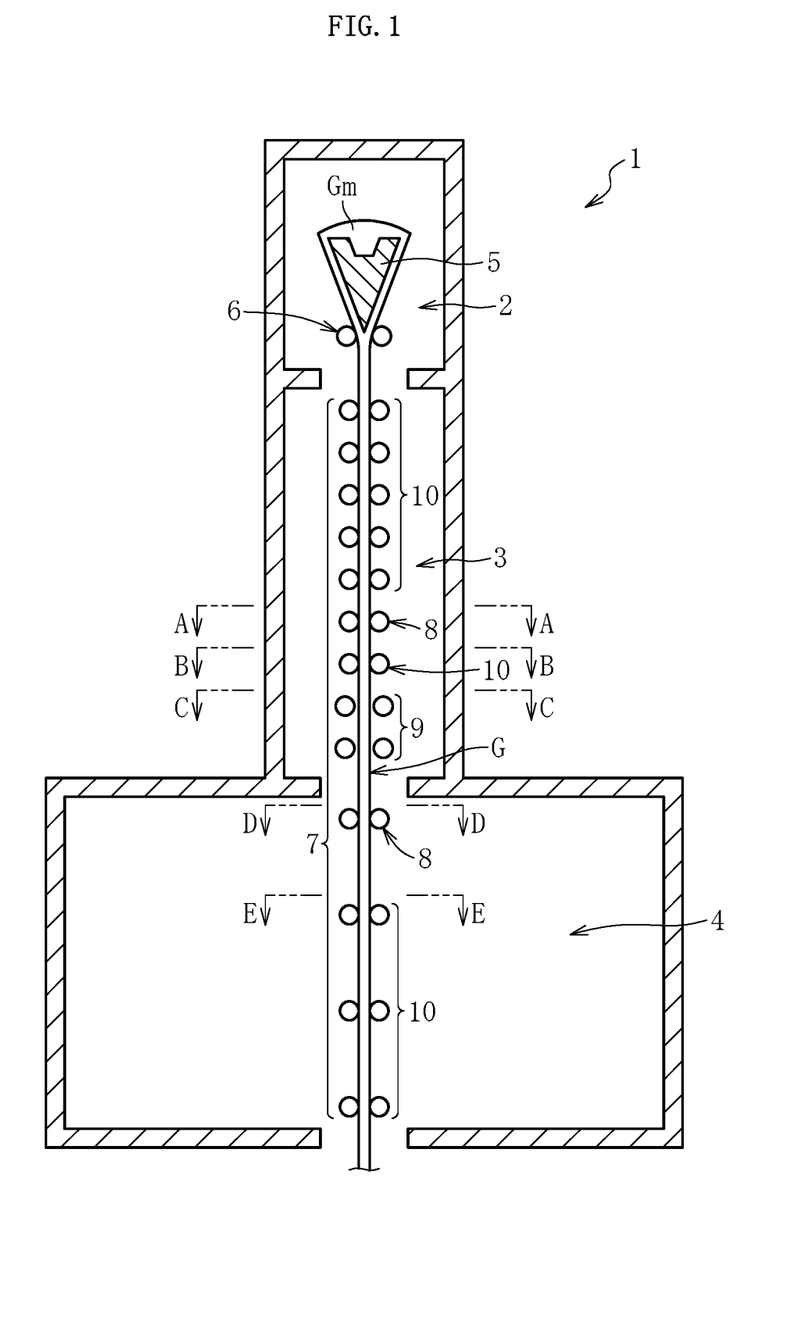
FIG. 1 is a schematic longitudinal sectional view for illustrating a glass ribbon manufacturing apparatus according to an embodiment of the present invention.

FIG. 1 is a schematic longitudinal sectional view for illustrating a glass ribbon manufacturing apparatus 1 according to an embodiment of the present invention. The glass ribbon manufacturing apparatus 1 is configured to forma sheet-shaped glass ribbon G serving as a basis of a glass sheet by an overflow downd-raw process. The glass sheet manufactured by cutting the glass ribbon G is used for a glass substrate for flat panel displays including a liquid crystal display, a plasma display, and an OLED display and devices including a solar cell, a lithium ion battery, a digital signage, a touch panel, and electronic paper, a cover glass for an OLED illumination, a glass container for medicines, a window sheet glass, and a lightweight laminated window glass.

It is preferred that a thickness of a center portion of the glass ribbon G in a width direction be from 10 µm to 2 mm. When the thickness of the glass ribbon G is smaller than 10 µm, there is a fear in that formation of the glass ribbon G itself may become difficult. When the thickness of the glass ribbon G exceeds 2 mm, a shape and a posture are less likely to be varied. Therefore, there is a fear in that the present invention does not become effective anymore. From the viewpoints described above, it is more preferred that the thickness of the center portion of the glass ribbon G in the width direction be from 20 µm to 1 mm, and it is most preferred that the thickness of the center portion of the glass ribbon G in the width direction be from 30 µm to 500 µm.

It is preferred that a width of the glass ribbon G be from 250 mm to 3,000 mm. When the width of the glass ribbon G is smaller than 250 mm, the glass ribbon is less likely to be curved in the width direction, resulting in a fear that the present invention does not become effective anymore. When the width of the glass ribbon G exceeds 3,000 mm, there is a fear in that the manufacture may become difficult. From the viewpoints described above, it is more preferred that the width of the glass ribbon G be from 280 mm to 2,500 mm, and it is most preferred that the width of the glass ribbon G be from 300 mm to 2,000 mm.

More specifically, the glass ribbon manufacturing apparatus 1 comprises a forming region 2 in which a forming step is carried out, an annealing region 3 in which an annealing step is carried out, and a cooling region 4 in which a cooling step is carried out, in the descending order from the top.

In the forming region 2, molten glass Gm is supplied to a compact 5 having a wedge-like sectional shape while the molten glass Gm overflowing from a top of the compact 5 is caused to join at a lower end portion to be caused to flow down, thereby forming a band-like glass ribbon G of the molten glass Gm. The glass ribbon G is nipped by a cooling roller 6 on both sides in a width direction in the forming region 2, thereby suppressing contraction thereof in the width direction. In the annealing region 3, an internal strain thereof is removed while annealing the glass ribbon G formed in the forming region 2. In the cooling region 4, the glass ribbon G annealed in the annealing region 3 is cooled to the vicinity of a room temperature. The glass ribbon G is moved down from the forming region 2 into the cooling region 4.

The glass ribbon manufacturing apparatus 1 comprises a plurality of support rollers 7 configured to support the both sides of the glass ribbon G in the width direction, which are provided in the annealing region 3 and the cooling region 4 along a direction of downward movement of the glass ribbon G.

The support rollers 7 provided in the annealing region 3 are made from a material having heat resistance, for example, an inorganic material containing ceramic fiber and a binder. Further, each of the support rollers 7 provided in the cooling region 4 has a surface layer made up of, for example, an elastic member of a silicone rubber or the like.

Here, one of the support rollers 7 provided in the annealing region 3 serves as a shape stabilization roller 8 configured to stabilize a shape of the glass ribbon G curved in the width direction. Further, in the annealing region 3, some of the support rollers 7 provided below the shape stabilization rollers 8 serve as auxiliary rollers 9 configured to auxiliarly stabilize the shape of the glass ribbon G curved in the width direction. Further, the support rollers 7 provided above the shape stabilization rollers 8 and between the shape stabilization rollers 8 and the auxiliary rollers 9 in the annealing region 3 serve as nipping rollers 10 configured to nip the both sides of the glass ribbon G in the width direction.

Further, the support roller 7 located uppermost in the cooling region 4 serves as the shape stabilization roller 8. Further, the support rollers 7 provided below the shape stabilization rollers 8 in the cooling region 4 serve as the nipping rollers 10.

Figure 2:
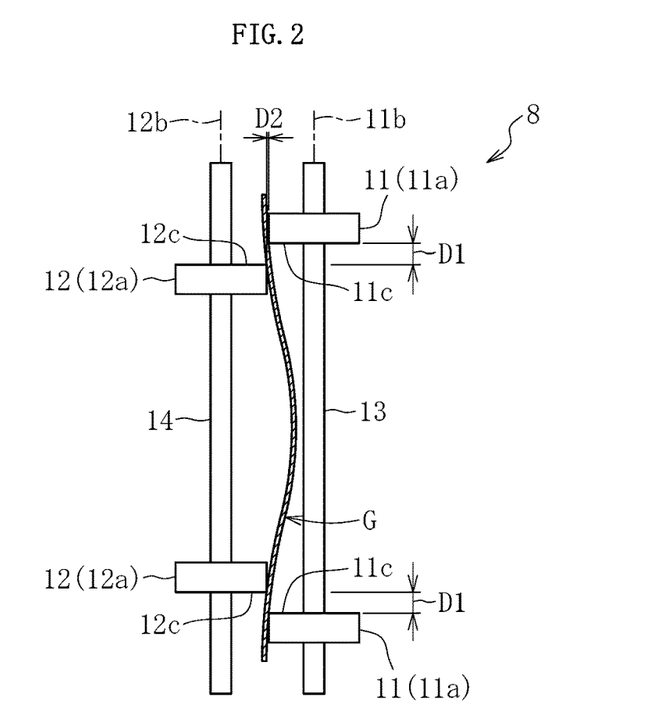
FIG. 2 is a sectional view taken along the line A-A of FIG. 1 as viewed in a direction of the arrows, which is a schematic plan view for illustrating a shape stabilization roller.
Figure 3:
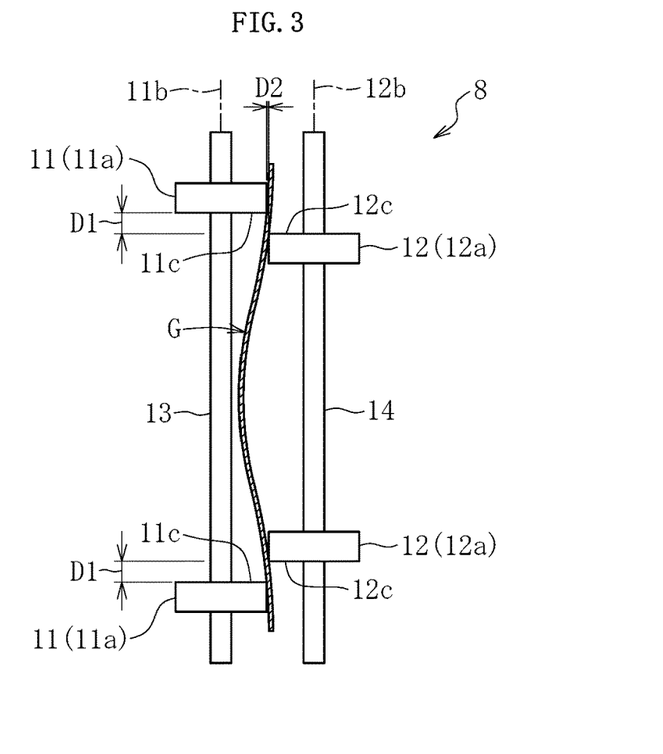
FIG. 3 is a sectional view taken along the line D-D of FIG. 1 as viewed in a direction of the arrows, which is a schematic plan view for illustrating the shape stabilization roller.

As illustrated in FIG. 2 and FIG. 3, the shape stabilization roller 8 comprises a first roller 11 arranged on one of a front surface side and a rear surface side of the glass ribbon G and a second roller 12 arranged on another of the surface sides of the glass ribbon G. The first roller 11 comprises a pair of first rollers 11a (support portions) configured to support the both sides of the glass ribbon G in the width direction. The rollers 11a are arranged coaxially. The second roller 12 comprises a pair of rollers 12a (support portions) configured to support the both sides of the glass ribbon G in the width direction. The rollers 12a are arranged coaxially.

In this embodiment, the pair of rollers 11a is coupled and fixed to a first roller shaft 13, whereas the pair of rollers 12a is coupled and fixed to a second roller shaft 14. It is apparent that each of the rollers 11a and the rollers 12a may be supported in a cantilever manner.

Further, although the first roller 11 comprises the pair of rollers 11a and the second roller 12 comprises the pair of rollers 12a in this embodiment, the present invention is not limited thereto. For example, each of the first roller 11 and the second roller may be made up of a single roller elongated in the width direction of the glass ribbon G with a recessed portion formed in a center in the width direction so as to form a pair of support portions configured to support the glass ribbon G at both ends in the width direction.

In this embodiment, the first roller 11 and the second roller 12 are arranged at the same height. An rollers 11b of the first roller 11, that is, axes of the rollers 11a and an axis 12b of the second roller 12, that is, axes of the rollers 12a extend in a horizontal direction and are parallel to each other. The pair of rollers 11a constructing the first roller 11 and the pair of rollers 12a constructing the second roller 12 all have the same shape and the same dimensions. A center between the pair of rollers 11a and a center between the pair of rollers 12a are located at the same position in a direction along the rollers 11b of the first roller 11 and the axis 12b of the second roller 12.

In the shape stabilization roller 8, an inner end portion 11c of each of the pair of the rollers 11a of the first roller 11 in the width direction of the glass ribbon G is positioned on an outer side, in the width direction of the glass ribbon G, of an outer end portion 12c of a corresponding one of the pair of the rollers 12a (the roller 12a of the same side in the width direction of the glass ribbon G) of the second roller 12. It is preferred that an inter-end distance D1 between the inner end portion 11c of each of the rollers 11a and the outer end portion 12c of the corresponding roller 12a in a direction of the axes 11b and 12b, that is, in the width direction of the glass ribbon G be from 20 mm to 100 mm. When the inter-end distance D1 is smaller than 20 mm, the roller 11a and the roller 12a located on the same side are positioned closer to each other. Therefore, a portion of the glass ribbon G positioned therebetween is excessively inclined with respect to the axes 11b and 12b, for example, inclined at an angle of inclination of 20° or larger. Therefore, there is a fear in that an undue stress may be applied in the portion to cause damage. When the inter-end distance D1 exceeds 100 mm, the roller 11a on one side and the roller 12a on the one side are farther away from each other. Therefore, there arises a fear that the glass ribbon G cannot be sufficiently supported to prevent the curved shape from being stabilized. From the viewpoints described above, it is more preferred that the inter-end distance D1 be from 20 mm to 50 mm, and it is most preferred that the inter-end distance D1 be 20 mm to 40 mm.

Although a portion of each of the rollers 11a and 12a, which comes into contact with the glass ribbon G, is angulated in an illustrated example, it is preferred that the portion be rounded into a curved surface. In this case, an area of each of the rollers 11a and 12b, which comes into contact with the glass ribbon G, can be increased. As a result, in addition to enhancement of a retention force for the shape of the glass ribbon G, the glass ribbon G can be prevented from coming into point contact with the rollers 11a and 12a. Therefore, generation of a crack in the glass ribbon G can be suppressed.

Further, as described above, each of the support rollers 7 provided in the cooling region 4 comprises the surface layer made up of the elastic member. Therefore, the shape stabilization rollers 8 provided in the cooling region 4 have a larger gripping force for the glass ribbon G than the shape stabilization rollers 8 provided in the annealing region 3. Thus, the curved shape of the glass ribbon G can be effectively stabilized.

Further, it is preferred that a distance D2 between the roller 11a of the first roller 11 and the roller 12a of the second roller 12 of the shape stabilization roller 8 in a thickness direction of the glass ribbon G, that is, in a direction perpendicular to the axes 11b and 12b be from −10 mm to 7 mm. Here, a direction in which the first roller 11 and the second roller 12 separate from each other is positive. When the distance D2 is smaller than −10 mm, an excessive load is applied to a portion of the glass ribbon G, which is positioned between the roller 11a on one side and the roller 12a on the one side. As a result, there arises a risk of damage. When the distance D2 exceeds 7 mm, there arises a risk that the glass ribbon G cannot be sufficiently supported to prevent the curved shape from being stabilized. From the viewpoints described above, it is more preferred that the distance D2 be from −7 mm to 5 mm, and it is most preferred that the distance D2 be from −5 mm to 3 mm.

When the shape stabilization roller 8 is provided in the annealing region 3, it is preferred that the shape stabilization roller 8 be provided in a lower part of the annealing region 3. This is because there is a fear in that the glass ribbon G cannot be sufficiently supported by the shape stabilization rollers 8 due to insufficient solidification of the glass ribbon G in an upper part of the annealing region 3. Also, this is because there is a fear in that the glass ribbon G is not curved yet in the width direction in the upper part of the annealing region 3.

Further, it is preferred that the number of shape stabilization rollers 8 be 5% or larger of the number of rollers excluding the auxiliary rollers 9 provided in the annealing region 3 and the cooling region 4. When the number of shape stabilization rollers 8 is smaller than 5%, there is a fear in that effects of the shape stabilization rollers 8 cannot be sufficiently obtained. From the viewpoints described above, it is more preferred that the number of shape stabilization rollers 8 be 8% or larger of the number of rollers excluding the auxiliary rollers 9 arranged in the annealing region 3 and the cooling region 4, and it is most preferred that the number of shape stabilization rollers 8 be 10% or larger.

Further, it is preferred that the number of shape stabilization rollers 8 be 40% or smaller of the number of rollers excluding the auxiliary rollers 9 provided in the annealing region 3 and the cooling region 4. When the number of shape stabilization rollers 8 is larger than 40%, there is a fear in that effects of the nipping rollers 10 cannot be sufficiently obtained. In addition to an effect of suppressing oscillation of the both ends of the glass ribbon G in the width direction, the nipping rollers 10 also have an effect of suppressing contraction of the glass ribbon G in the width direction when the nipping rollers 10 are provided in the upper part of the annealing region. From the viewpoints described above, it is more preferred that the number of shape stabilization rollers 8 be 35% or smaller of the number of rollers excluding the auxiliary rollers 9 arranged in the annealing region 3 and the cooling region 4, and it is most preferred that the number of shape stabilization rollers 8 be 30% or smaller.

Figure 4:
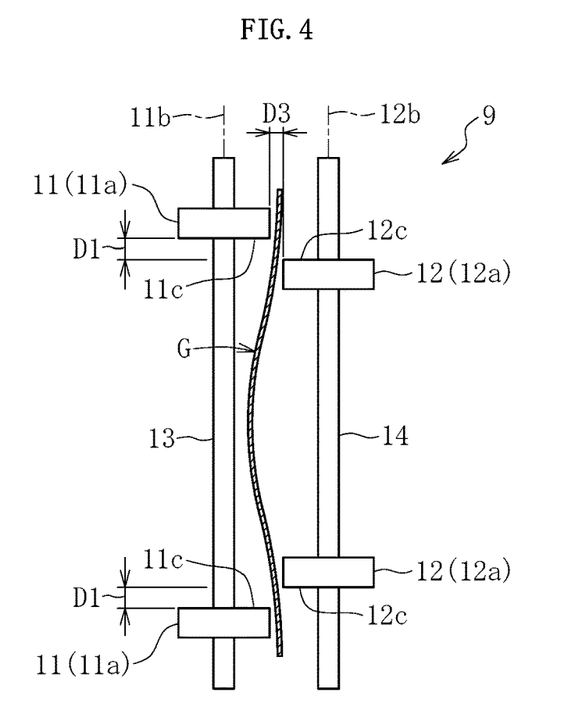
FIG. 4 is a sectional view taken along the line C-C of FIG. 1 as viewed in a direction of the arrows, which is a schematic plan view for illustrating an auxiliary roller.

As illustrated in FIG. 4, similarly to the shape stabilization roller 8, the auxiliary roller 9 comprises the first roller 11 arranged on one of the front surface side and the rear surface side of the glass ribbon G and the second roller 12 arranged on another surface side of the glass ribbon G.

The auxiliary roller 9 differs from the shape stabilization roller 8 in that a distance D3 between the roller 11a of the first roller 11 and the roller 12a of the second roller 12 of the auxiliary roller 9 in the thickness direction of the glass ribbon G, that is, in the direction perpendicular to the axes 11b and 12b is larger than the distance D2 in the shape stabilization roller 8 provided in the annealing region 3. The distance D3 is larger than the distance D2, and hence the auxiliary rollers 9 come into contact with the glass ribbon G only when a curved shape or a position of the glass ribbon G is about to greatly change. The remaining configuration is the same as that of the shape stabilization roller 8, and a description thereof is herein omitted.

It is preferred that a difference between the distance D3 in the auxiliary roller 9 and the distance D2 in the shape stabilization roller 8 be from 0.5 mm to 3 mm. When the difference between the distance D3 and the distance D2 is smaller than 0.5 mm, the glass ribbon G frequently comes into contact with the first roller 11 and the second roller 12 of the auxiliary roller 9, resulting in a risk of unreasonably applying a load to the glass ribbon G due to contact. When the difference between the distance D3 and the distance D2 exceeds 3 mm, the glass ribbon G can scarcely come into contact with the first roller 11 and the second roller 12 of the auxiliary roller 9, resulting in a risk of failing to stabilize the curved shape of the glass ribbon G. From the above-mentioned viewpoints, it is more preferred that the difference between the distance D3 and the distance D2 be from 0.5 mm to 2 mm, and it is most preferred that the difference between the distance D3 and the distance D2 be from 0.5 mm to 1 mm.

Figure 5:
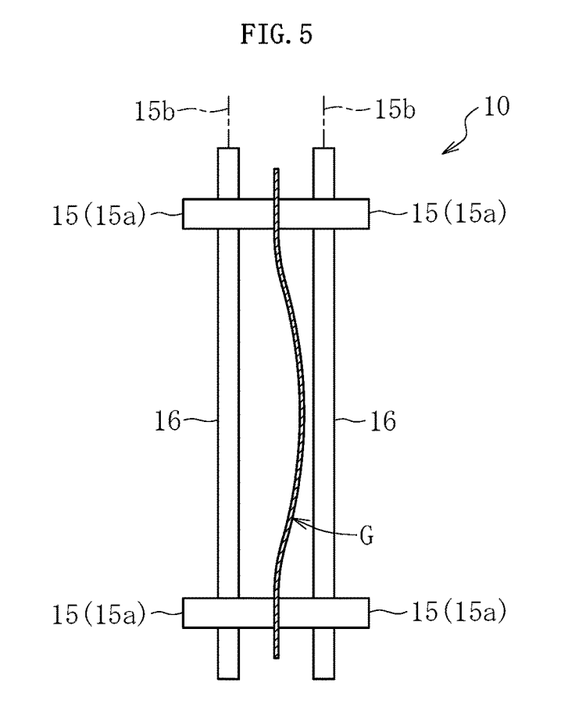
FIG. 5 is a sectional view taken along the line B-B of FIG. 1 as viewed in a direction of the arrows, which is a schematic plan view for illustrating a nipping roller.
Figure 6:
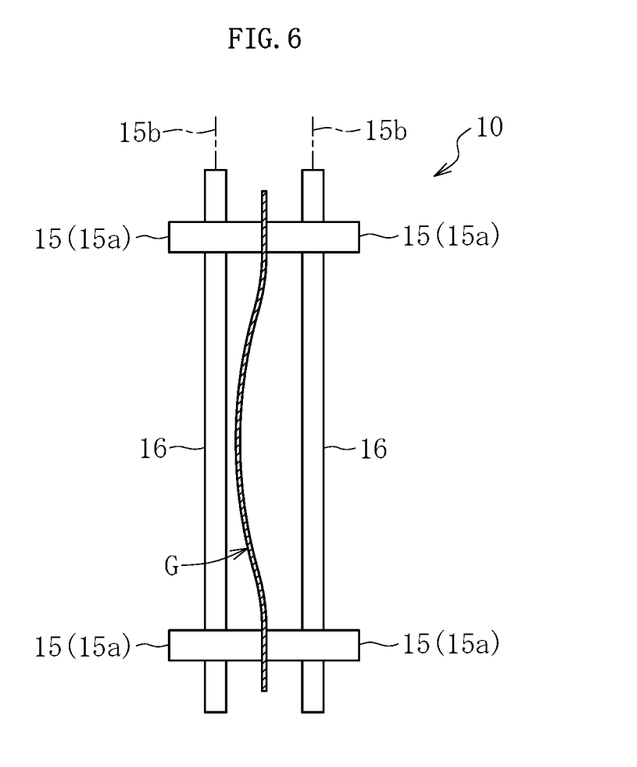
FIG. 6 is a sectional view taken along the line E-E of FIG. 1 as viewed in a direction of the arrows, which is a schematic plan view for illustrating the nipping roller.

As illustrated in FIG. 5 and FIG. 6, the nipping roller 10 comprises a pair of rollers 15 and 15 arranged respectively on the front surface side and the rear surface side of the glass ribbon G. Each of the rollers 15 comprises a pair of rollers 15a (support portions) configured to support the both sides of the glass ribbon G in the width direction. The rollers 15a are arranged coaxially. Although the pair of rollers 15a are coupled and fixed to a roller shaft 16 in this embodiment, it is apparent that the individual roller 15a may be supported in a cantilever manner.

Further, although the roller 15 comprises the pair of rollers 15a in this embodiment, the roller 15 may comprise a single roller that is elongated in the width direction of the glass ribbon G and has a recessed portion formed in a center in the width direction so as to form a pair of support portions configured to support the glass ribbon G at both ends in the width direction.

In this embodiment, the roller 15 on one surface side and the roller 15 on another surface side of the glass ribbon G are provided at the same height. An axis 15b of the roller 15 on the one surface side and an axis 15b of the roller 15 on the another surface side extend in the horizontal direction and are parallel to each other. The pair of rollers 15a constructing the roller 15 on the one surface side and the pair of rollers 15a constructing the roller 15 on the another surface side have the same shape and the same dimensions.

On one side of the glass ribbon G in the width direction, the nipping roller 10 nips the end portion of the glass ribbon G in the width direction from the front side and the rear side with the roller 15a on the one surface side and the roller 15a on the another surface side. Further, on the another surface side of the glass ribbon G in the width direction, the nipping roller 10 nips the end portion of the glass ribbon G in the width direction from the front side and the rear side with the roller 15a on the one surface side and the roller 15a on the another surface side.

As illustrated in FIG. 2 and FIG. 3, the first roller 11 of the shape stabilization roller 8 provided in the annealing region 3 is arranged on the surface side of the glass ribbon G, which is opposite to a surface side on which the first roller 11 of the shape stabilization roller 8 provided in the cooling region 4 is arranged, while the second roller 12 of the shape stabilization roller 8 provided in the annealing region 3 is arranged on the surface side of the glass ribbon G, which is opposite to a surface side on which the second roller 12 of the shape stabilization roller 8 provided in the cooling region 4 is arranged.

As illustrated in FIG. 3 and FIG. 4, the first roller 11 of the auxiliary roller 9 is arranged on the same surface side of the glass ribbon G as the surface side on which the first roller 11 of the shape stabilization roller 8 provided in the cooling region 4 is arranged, while the second roller 12 of the auxiliary roller 9 is arranged on the same surface side of the glass ribbon G as the surface side on which the second roller 12 of the shape stabilization roller 8 provided in the cooling region 4 is arranged.

Due to the shape stabilization roller 8 and the auxiliary rollers 9 provided in the annealing region 3 and the shape stabilization roller 8 provided in the cooling region 4 described above, the direction of curvature of the glass ribbon G in the width direction in the annealing region 3 is opposed to the direction of curvature of the glass ribbon G in the cooling region 4.

Although it is preferred that the shape stabilization rollers 8, the auxiliary rollers 9, and the nipping rollers 10 be all driven to rotate, some rollers may be driven by the following driving. In the case of being driven to rotate, it is preferred that rotation speeds of the shape stabilization rollers 8, the auxiliary rollers 9, and the nipping rollers 10 be all the same.

The following effects can be enjoyed from the glass ribbon manufacturing apparatus 1 configured as described above.

In the shape stabilization roller 8, the inner end portions 11c of the rollers 11a of the first roller 11 are all positioned on the outer side of the outer end portions 12c of the rollers 12a of the corresponding second roller 12 in the width direction of the glass ribbon G. Specifically, a mode, in which the glass ribbon G is supported by the second roller 12 on the inner side of the first roller 11 in the width direction, can be employed. In this manner, the glass ribbon G can be supported in the curved shape that is convex to the side of the first rollers 11 toward an inner side in the width direction. Therefore, the shape of the glass ribbon G curved in the width direction can be stabilized by the shape stabilization rollers 8.

Then, each of the rollers 11a of the first roller 11 and each of the rollers 12a of the second roller 12 of the shape stabilization roller 8 are not arranged so as to be opposed to each other through the glass ribbon G therebetween. Specifically, the rollers 11a of the first roller 11 and the rollers 12a of the second roller 12 do not employ a mode of nipping predetermined regions in the width direction on both sides of the glass ribbon G in the width direction. Thus, when the glass ribbon G starts being curved in a direction opposite to a supposed direction, a load, which is applied to the glass ribbon G by the shape stabilization roller 8 when the glass ribbon G is supported by the shape stabilization roller 8, is reduced as compared with a load applied when the rollers configured to nip the both sides of the glass ribbon in the width direction are arranged in a state in which axes are inclined within a horizontal plane. Specifically, the shape stabilization rollers 8 can reduce the load applied to the glass ribbon G as compared with the load applied when the rollers configured to nip the both sides of the glass ribbon in the width direction are arranged in a state in which the axes are inclined. Thus, the risk of generation of a crack in the glass ribbon G can be reduced. As described above, in the glass ribbon manufacturing apparatus 1 of this embodiment, even when the glass ribbon G starts being curved in the direction opposite to the supposed direction, the direction of curvature of the glass ribbon G can be stabilized on one of the front side and the rear side without generating a crack in the glass ribbon G.

The present invention is not limited to the embodiment described above, and various modifications can be made within the range of technical ideas thereof. For example, although the shape stabilization roller is arranged in each of the annealing region and the cooling region in the embodiment described above, the number of the shape stabilization rollers may be one in the annealing region and the cooling region. Further, the glass ribbon is formed by the overflow downd-raw process in the embodiment described above, the glass ribbon may be formed by other methods such as a slot downd-raw process or a re-draw process.

REFERENCE SIGNS LIST

1 glass ribbon manufacturing apparatus
3 annealing region
4 cooling region
7 support roller
8 shape stabilization roller
9 auxiliary roller
10 nipping roller
11 first roller
11a roller (support portion)
11b axis
11c inner end portion
12 second roller
12a roller (support portion)
12b axis
12c outer end portion
D2 distance between first roller and second roller
D3 distance between first roller and second roller
G glass ribbon

The invention claimed is:

1. A glass ribbon manufacturing apparatus comprising:
an annealing region for annealing a formed glass ribbon to remove an internal strain thereof;
a cooling region for cooling the glass ribbon being annealed to a vicinity of a room temperature; and
a plurality of support rollers configured to support both sides of the glass ribbon in a width direction and arranged along a direction of downward movement of the glass ribbon in the annealing region and the cooling region,
wherein at least one of the plurality of support rollers comprises a shape stabilization roller configured to stabilize a shape of the glass ribbon curved in the width direction,
wherein the shape stabilization roller comprises:
a first roller being arranged on one surface side of the glass ribbon and having a pair of support portions configured to support only end portions of the glass ribbon at both of the sides of the glass ribbon in the width direction; and
a second roller being arranged on another surface side of the glass ribbon and having a pair of support portions configured to support only the end portions of the glass ribbon at both of the sides of the glass ribbon in the width direction,
wherein an inner end portion of each of the pair of the support portions of the first roller in the width direction is positioned on an outer side, in the width direction, of an outer end portion of a corresponding one of the pair of the support portions of the second roller in the width direction, and
wherein a distance between the pair of support portions of the first roller and the pair of support portions of the second roller of the shape stabilization roller in a thickness direction of the glass ribbon is positive.

2. The glass ribbon manufacturing apparatus according to claim 1, wherein an uppermost support roller, in the cooling region, of the plurality of support rollers is the shape stabilization roller.

3. The glass ribbon manufacturing apparatus according to claim 2, wherein another support roller, in the annealing region, of the plurality of support rollers is another shape stabilization roller.

4. The glass ribbon manufacturing apparatus according to claim 3,
wherein the another shape stabilization roller comprises:
a first roller being arranged on the other surface side of the glass ribbon and having a pair of support portions configured to support only the end portions of the glass ribbon at both of the sides of the glass ribbon in the width direction; and
a second roller being arranged on the one surface side of the glass ribbon and having a pair of support portions configured to support only the end portions of the glass ribbon at both of the sides of the glass ribbon in the width direction, and
wherein an inner end portion of each of the pair of the support portions of the first roller of the another shape stabilization roller in the width direction is positioned on an outer side, in the width direction, of an outer end portion of a corresponding one of the pair of the support portions of the second roller of the another shape stabilization roller in the width direction.

5. The glass ribbon manufacturing apparatus according to claim 3, further comprising an auxiliary roller arranged below the another shape stabilization roller in the annealing region and being configured to auxiliarly stabilize the shape of the glass ribbon curved in the width direction,
wherein the another shape stabilization roller comprises a first roller and a second roller,
wherein the auxiliary roller comprises a first roller and a second roller, and
wherein a distance between the first roller and the second roller of the auxiliary roller in the thickness direction of the glass ribbon is larger than a distance between the first roller and the second roller of the another shape stabilization roller provided in the annealing region in the thickness direction.

6. The glass ribbon manufacturing apparatus according to claim 5,
wherein the first roller of the another shape stabilization roller provided in the annealing region is arranged on the other surface side of the glass ribbon, which is opposite to the one surface side of the glass ribbon on which the first roller of the shape stabilization roller provided in the cooling region is arranged, and
wherein the first roller of the auxiliary roller is arranged on the one surface side of the glass ribbon.

7. The glass ribbon manufacturing apparatus according to claim 5, wherein an additional support roller of the plurality of support rollers is configured to nip both of the sides of the glass ribbon in the width direction, and is provided between the another shape stabilization roller and the auxiliary roller in the annealing region.

8. The glass ribbon manufacturing apparatus according to claim 2, wherein an additional support roller of the plurality of support rollers is configured to nip both of the sides of the glass ribbon in the width direction, and is provided below the shape stabilization roller in the cooling region.

9. The glass ribbon manufacturing apparatus according to claim 1, wherein
the first roller is free of support portions facing a center portion of the glass ribbon located between the end portions of the glass ribbon, and
the second roller is free of support portions facing the center portion of the glass ribbon located between the end portions of the glass ribbon.

10. The glass ribbon manufacturing apparatus according to claim 1, wherein
the support portions of the first roller are arranged such that a distance between the support portions of the first roller is greater than a width of each of the end portions of the glass ribbon in the width direction, and
the support portions of the second roller are arranged such that a distance between the support portions of the second roller is greater than the width of each of the end portions of the glass ribbon in the width direction.

11. A method of manufacturing a glass ribbon, the method comprising the steps of:
annealing a formed glass ribbon to remove an internal strain thereof; and
cooling the glass ribbon being annealed to a vicinity of a room temperature,
wherein a plurality of support rollers are configured to support both sides of the glass ribbon in a width direction during the annealing and the cooling and are provided along a direction of downward movement of the glass ribbon during the annealing and the cooling,
wherein at least one of the plurality of the support rollers comprises a shape stabilization roller configured to stabilize a shape of the glass ribbon curved in the width direction,
wherein the shape stabilization roller comprises:
a first roller being arranged on one surface side of the glass ribbon and having a pair of supporting portions configured to support only end portions of the glass ribbon at both of the sides of the glass ribbon in the width direction; and
a second roller being arranged on another surface side of the glass ribbon and having a pair of supporting portions configured to support only the end portions of the glass ribbon at both of the sides of the glass ribbon in the width direction, and
wherein an inner end portion of each of the pair of the support portions of the first roller in the width direction is arranged on an outer side, in the width direction, of an outer end portion of a corresponding one of the pair of the support portions of the second roller in the width direction, and
wherein a distance between the pair of support portions of the first roller and the pair of support portions of the second roller of the shape stabilization roller in a thickness direction of the glass ribbon is positive.

* * * * *